Figure 7:
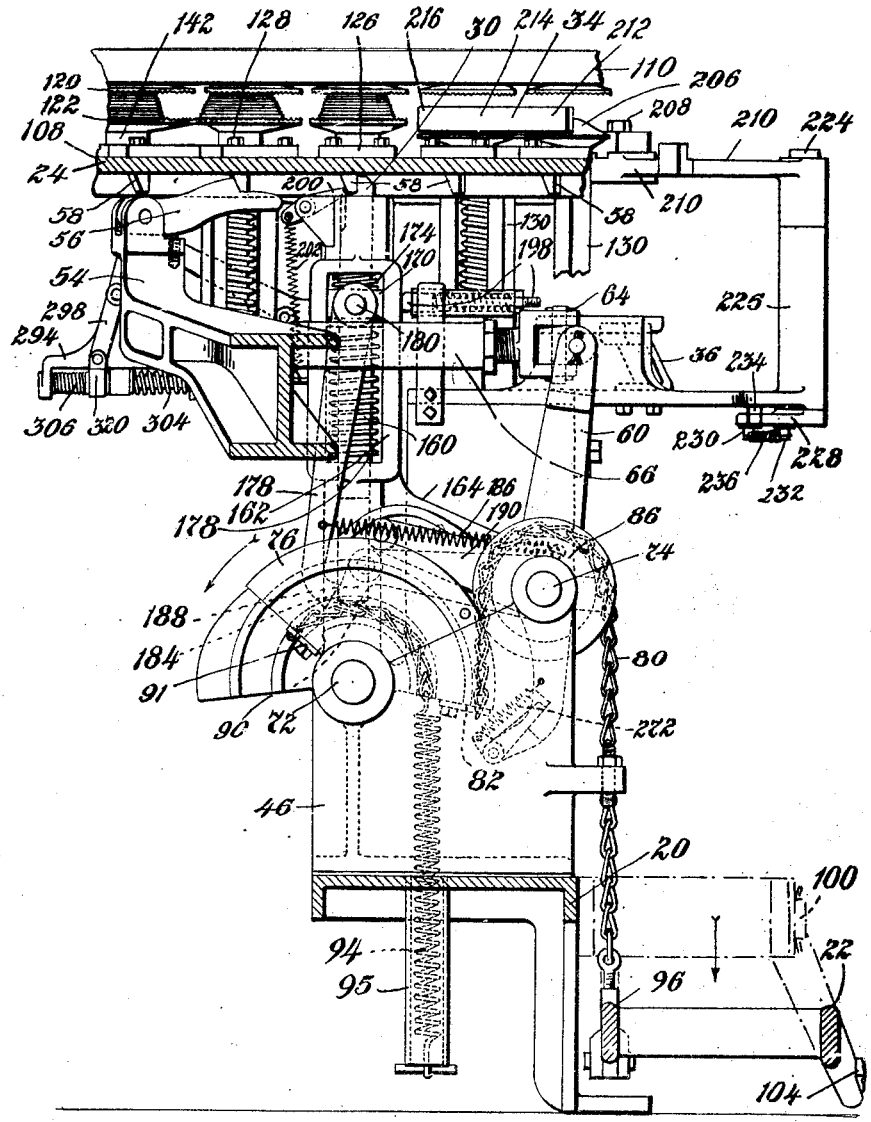

Jan. 8, 1929.  E. E. WINKLEY  1,698,042
HEEL PRESS
Filed Aug. 20, 1913   9 Sheets-Sheet 1
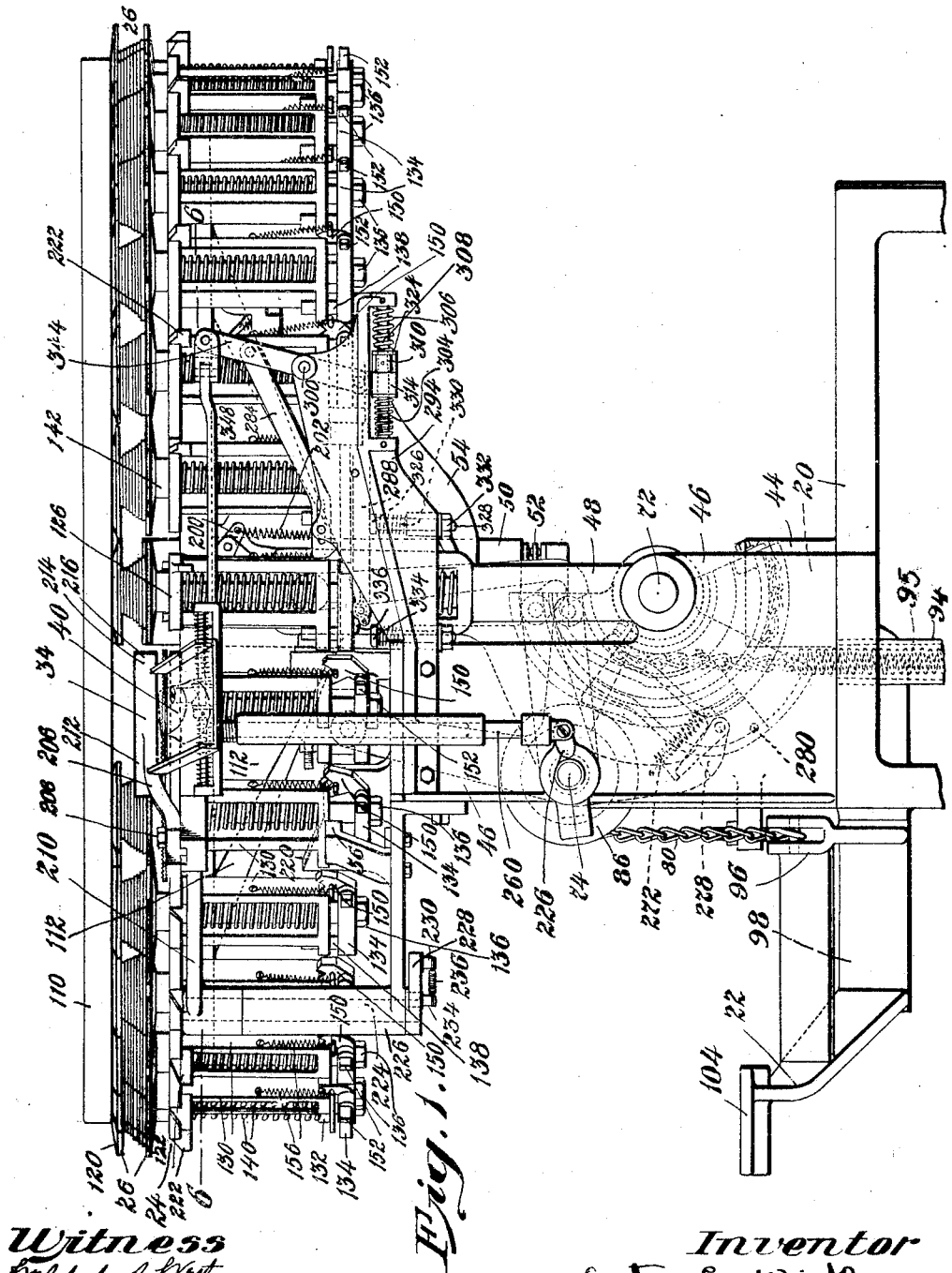

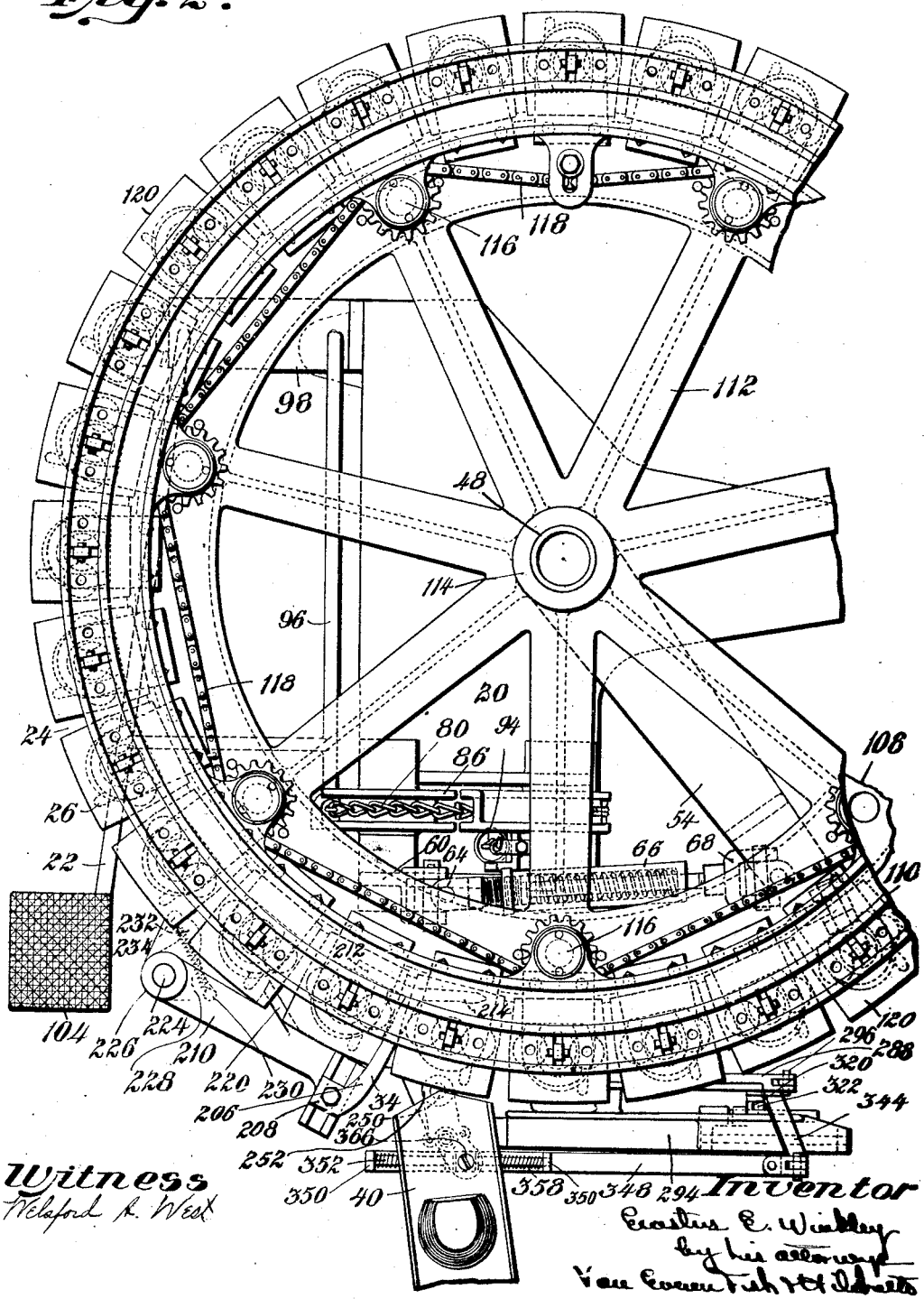

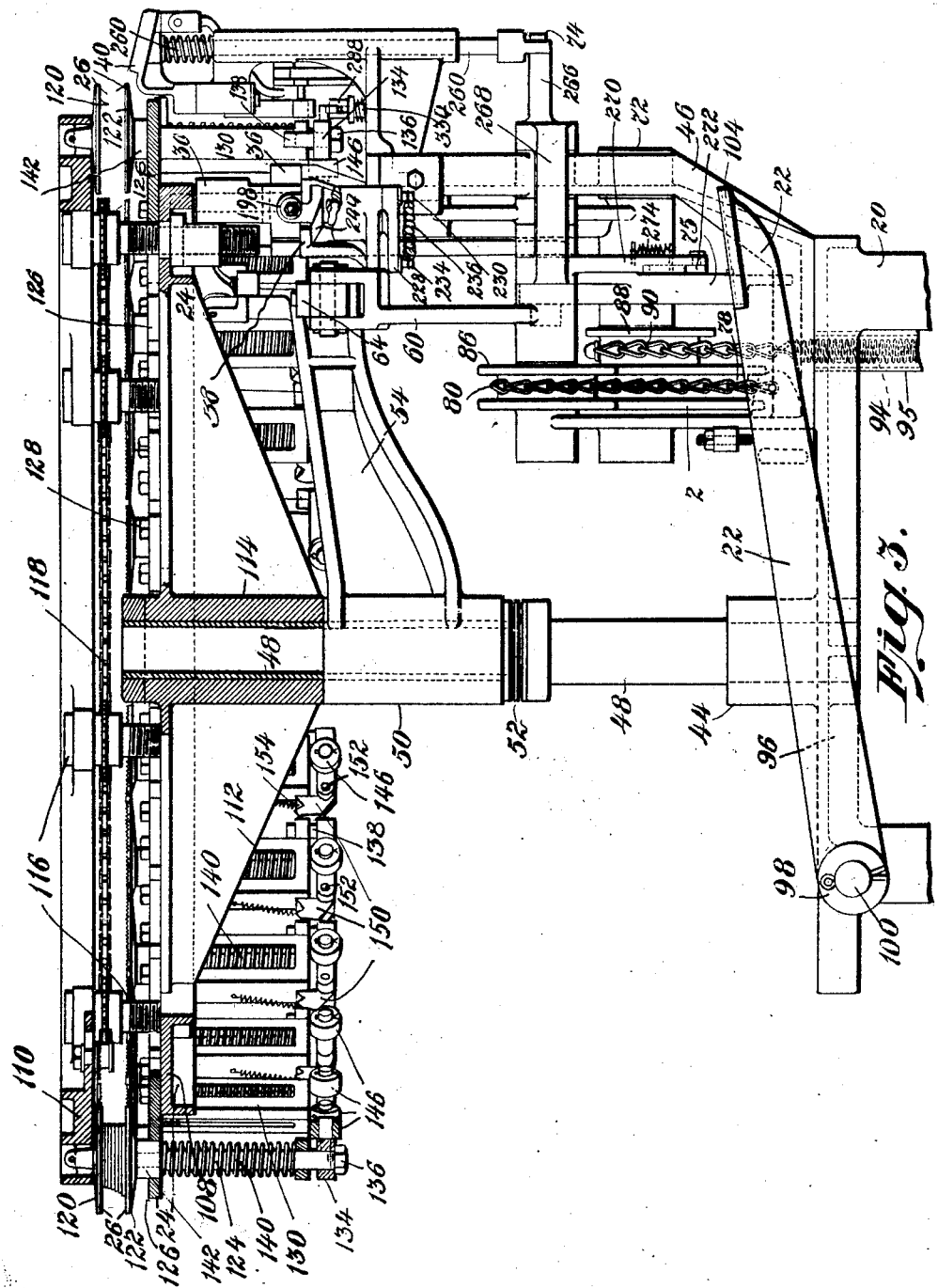

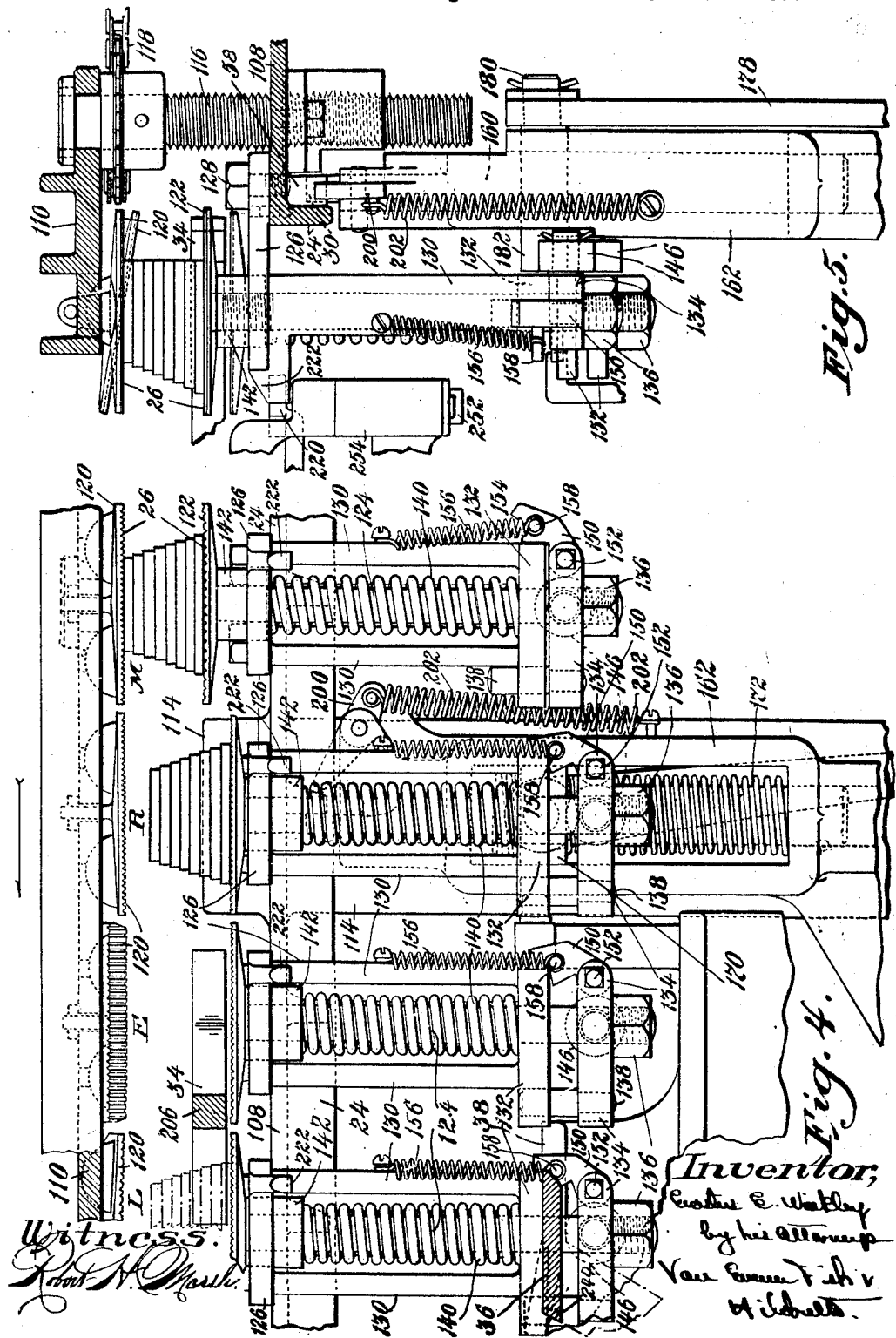

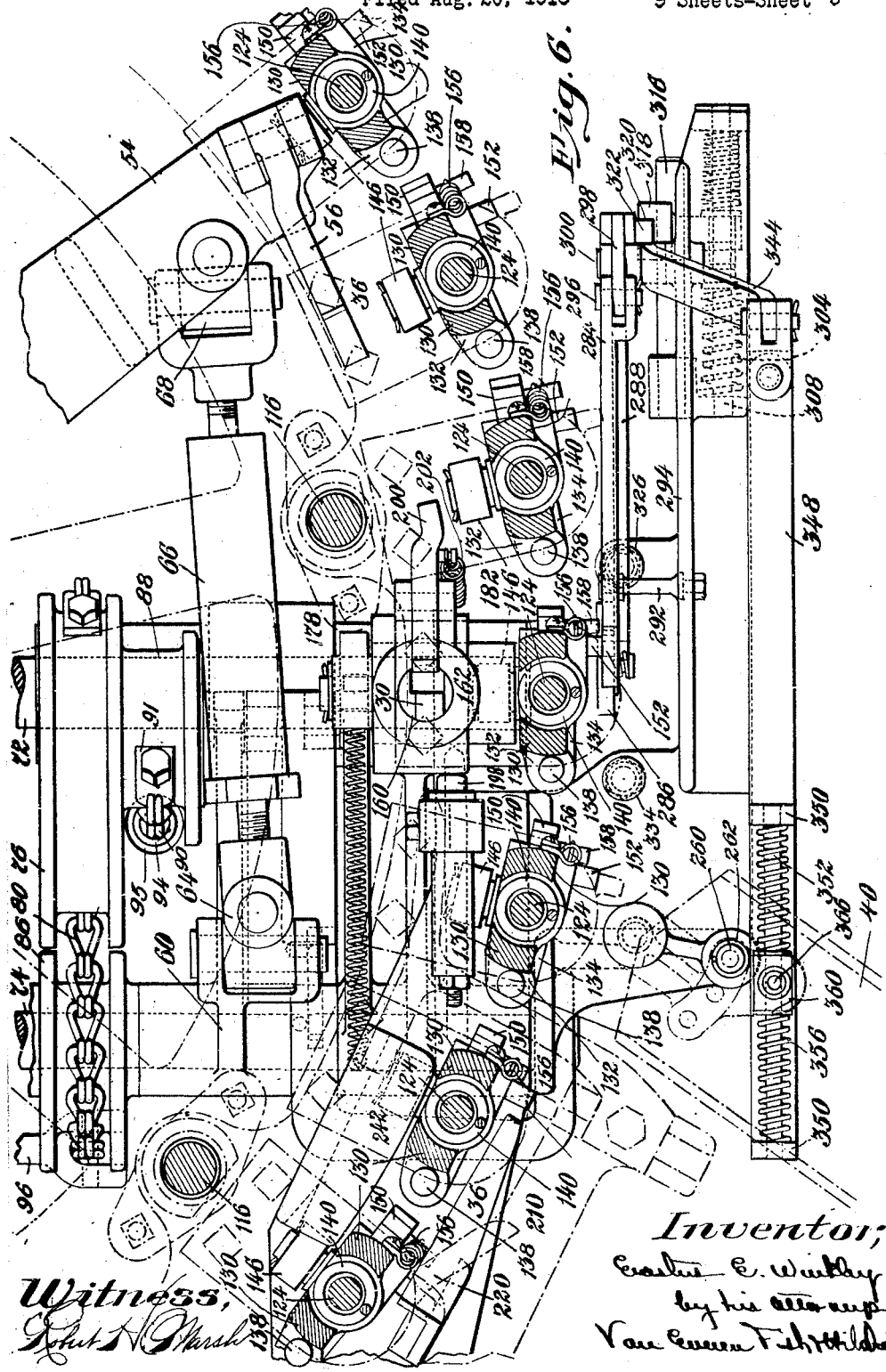

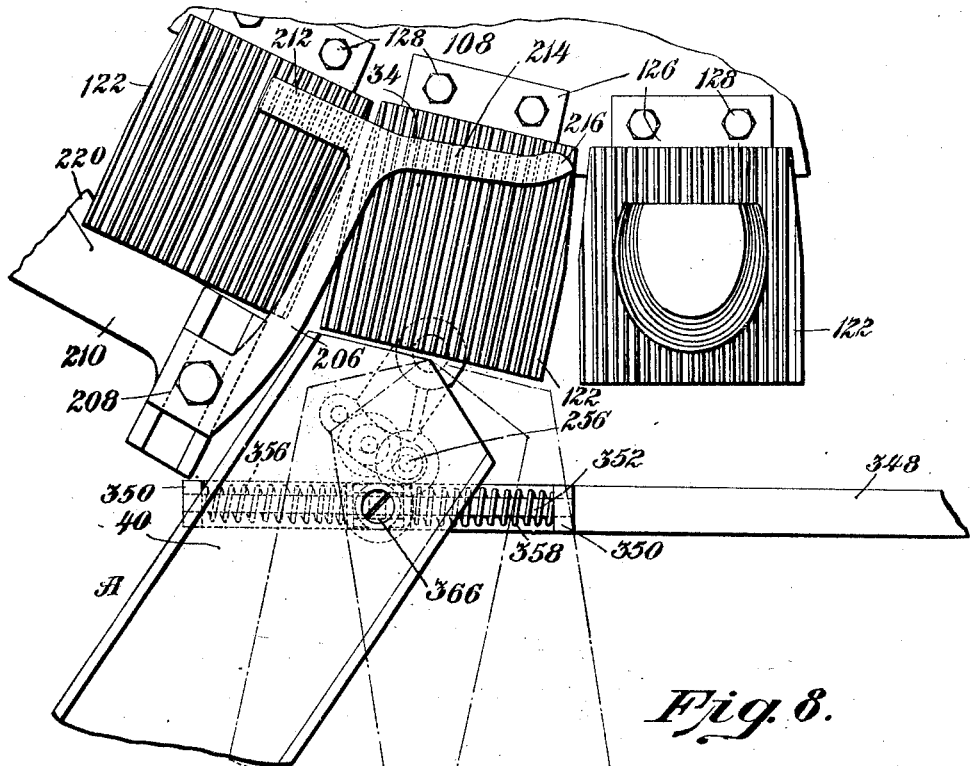
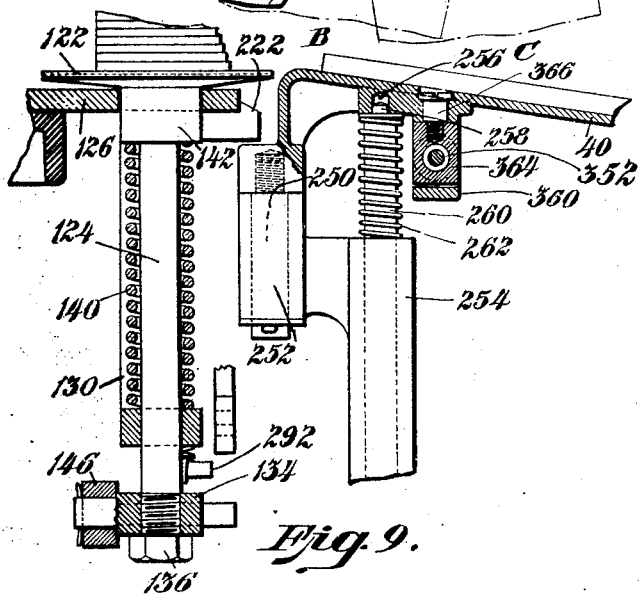
Fig. 8.
Fig. 9.

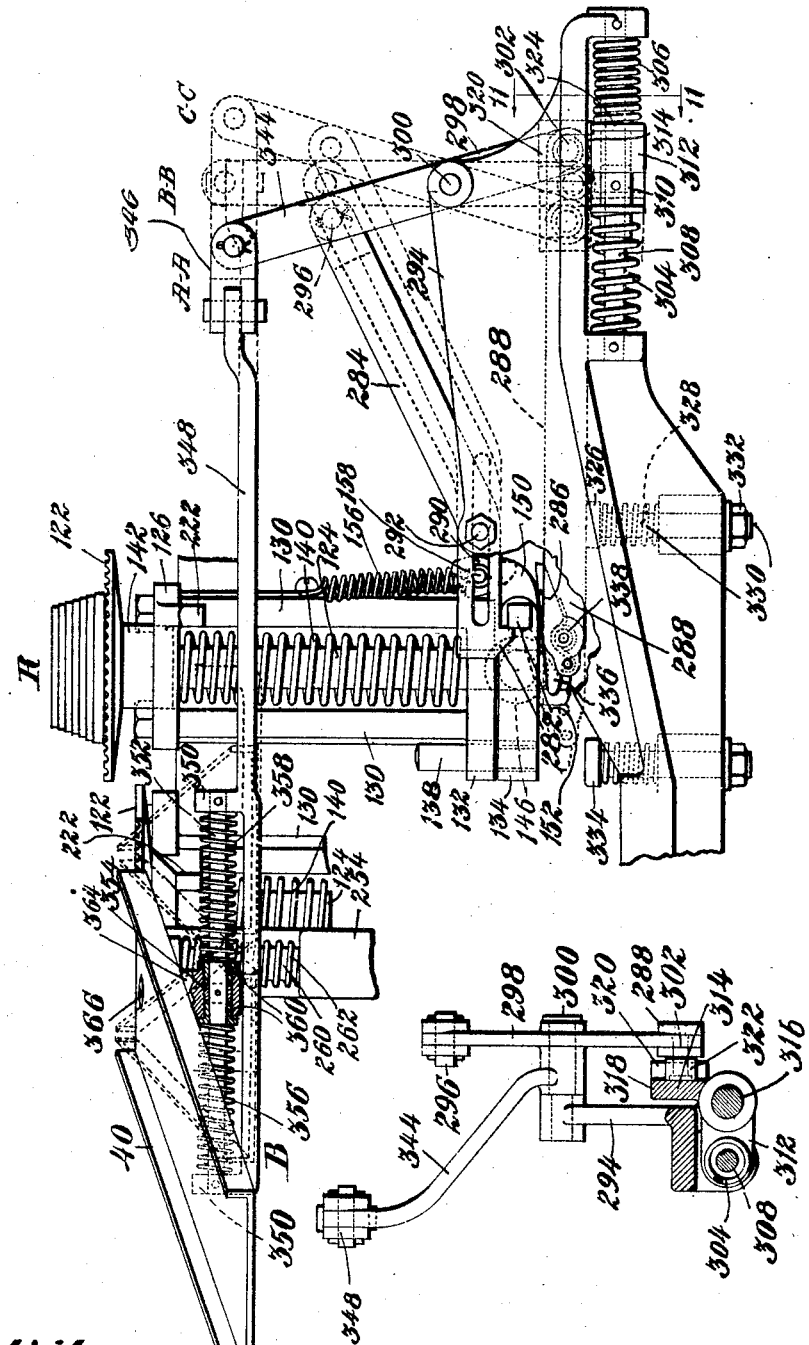

Jan. 8, 1929.   1,698,042
E. E. WINKLEY
HEEL PRESS
Filed Aug. 20, 1918   9 Sheets-Sheet 9
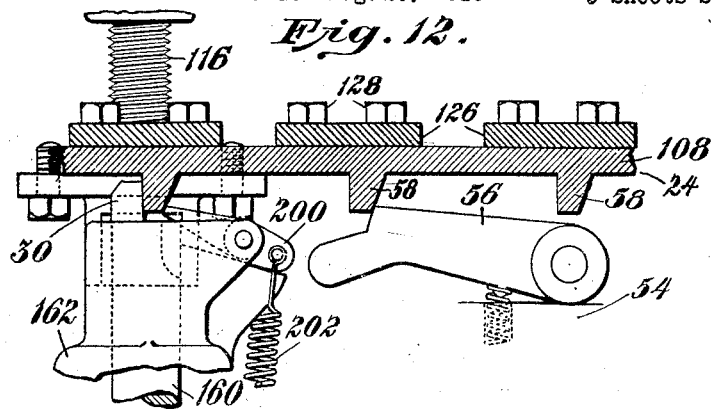
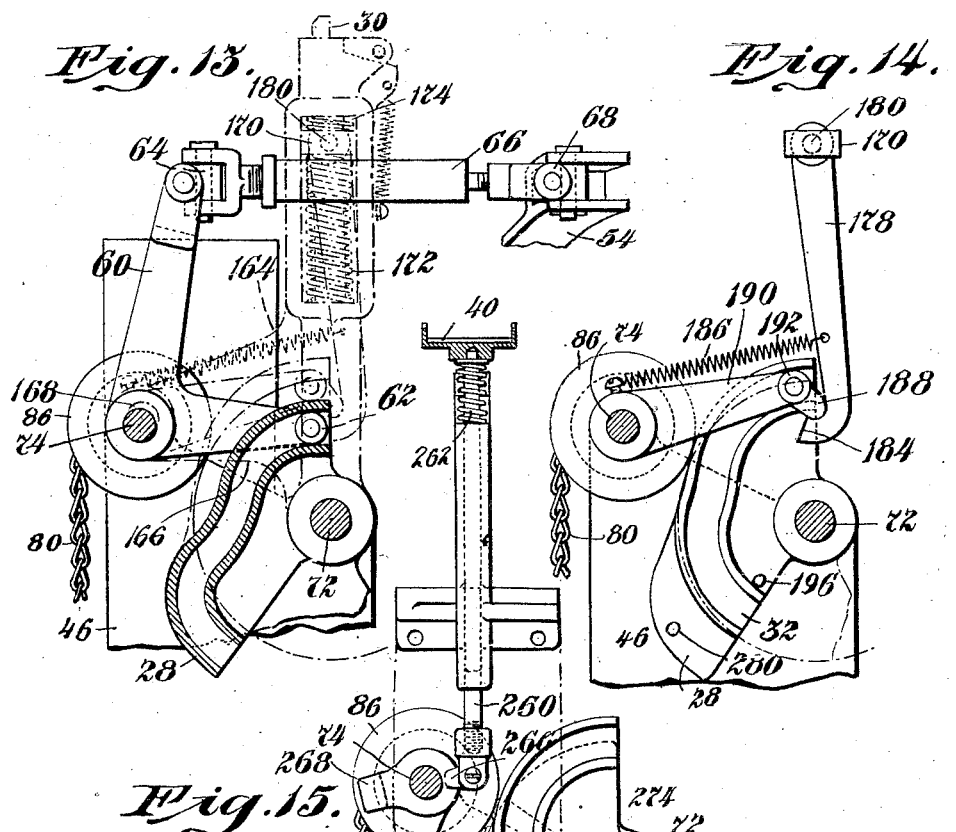
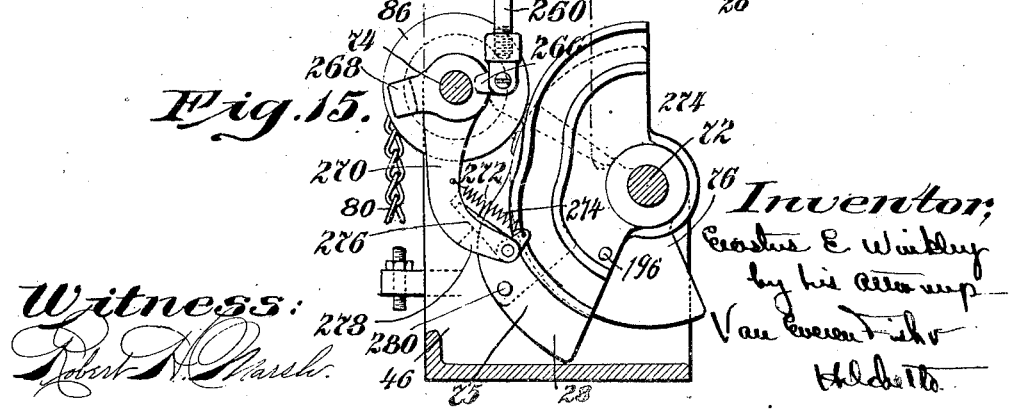

Patented Jan. 8, 1929.

1,698,042

UNITED STATES PATENT OFFICE.

ERASTUS E. WINKLEY, OF LYNN, MASSACHUSETTS, ASSIGNOR TO UNITED SHOE MACHINERY CORPORATION, OF PATERSON, NEW JERSEY, A CORPORATION OF NEW JERSEY.

HEEL PRESS.

Application filed August 20, 1918. Serial No. 250,644.

This invention relates to heel-presses for maintaining pressure upon newly built heel-piles composed of superposed lifts that are pasted together, during the setting or drying of the paste, and is designed primarily as an improvement of the heel-presses disclosed in Letters Patent of the United States to Erastus E. Winkley Nos. 1,452,671 and 1,452,672, granted April 24, 1923, although the several features of the invention are also applicable to other machines of this general class.

In the building of heels it is desirable that all heels be of approximately the same height and density when they come from the heel-compressor, and in order to obtain this result, it is essential that the heels be substantially of a predetermined height before being compressed. Obviously, if a heel before compression is too high, it will become unduly hard when compressed, while if it is too low, a relatively soft heel will be produced.

It is of material advantage to discover any such discrepancy in height before the heels are compressed, as the time and expense incident to the compressing operation is thus economized. Moreover, it is especially desirable to prevent the operation of the compressor upon low heels for the reason that while such heels are heavily compressed laterally, they are not rigidly confined in the direction of their height, and, therefore, there is a great tendency to open or check the joints and produce defective heels that are very difficult to repair in a satisfactory manner.

One of the objects of the present invention, therefore, is to provide a heel-press with a simple, effective and accurate measuring and sorting device for detecting the heights of the heels being pressed and for automatically discharging the heels from the heel-press into segregated lots according as the heels are of proper height, too high or too low.

Accordingly, one of the features of the invention resides in a heel-press comprising a plurality of separate sets of clamps which are independently adapted to measure the heights of the heels held therein, and in an automatic mechanism that is set by the successive heel-clamps in accordance with the measured heights of the heels being pressed, and which serves to properly position a discharge chute so that, as the heels are ejected from the clamps, they are directed into the appropriate receptacle, whereby the correct heels, low heels and high heels are segregated into lots or groups.

Other objects of the invention and features by which they are attained will become apparent from the following description of the preferred embodiment of the invention, as illustrated in the accompanying drawings, in which,—

Figure 1 is a view, in front elevation, of a heel-press constructed in accordance with the invention; Fig. 2 is a plan view of a portion of the machine shown in Fig. 1; Fig. 3 is a view, partially in section and partially in side elevation, of the machine shown in Figs. 1 and 2; Fig. 4 is a view on an enlarged scale and in development of a portion of the heel-clamps of the machine, showing particularly the heel-clamps at the various operating stations; Fig. 5 is a view, in end elevation, of that portion of the machine that is shown in Fig. 4; Fig. 6 is an enlarged plan view, partially in section, of the front portion of the machine, the section being taken along the line 6—6 of Fig. 1; Fig. 7 is a view, partially in section and partially in rear elevation, of a portion of the machine; Fig. 8 is an enlarged plan view of a portion of the machine, showing particularly the combined gage and ejector and the adjustable delivery chute; Fig. 9 is an enlarged view, partially in section and partially in side elevation, showing the relationship of the delivery chute and one of the heel-clamps and the position locking device for the delivery chute; Fig. 10 is a view, in front elevation, on an enlarged scale of the automatic measuring and sorting apparatus; Fig. 11 is a sectional view along the section line 11—11 of Fig. 10; Fig. 12 is an enlarged sectional view showing the carrier-actuating pawl and the buffer for arresting the movements of the carrier; Fig. 13 is an enlarged view, partially in section, showing the cam and a portion of the mechanism controlled thereby for effecting the step-by-step feed of the carrier and associated clamps; Fig. 14 is an enlarged view, partially in section and partially in elevation, of the cam and associated mechanism for effecting the release of the heel-clamps and the withdrawal of the buffer; and Fig. 15 is an enlarged view, partially in section, of the device for locking the delivery chute in position.

Referring to the drawings illustrating the preferred embodiment of the invention, the machine shown comprises a supporting frame 20 upon which the various parts of the machine are mounted; a treadle 22 whereby the component mechanisms of the machine may be operated by foot-power; a carrier 24 rotatably mounted upon the supporting frame; a plurality of heel-clamps 26 mounted upon the periphery of said carrier for severally holding freshly pasted heels under pressure until the paste has set; operating mechanism including a cam 28 for advancing the carrier and associated heel-clamps in a step-by-step movement through a measuring station M, a clamp-releasing station R, an ejecting station E and a loading station L (Fig. 4); a combined buffer and retractor 30, and means including a cam 32 for effecting its actuation, for arresting the movement of the carrier as the several heel-clamps are advanced step-by-step through their various stations and for releasing the clamps as they are successively brought into the clamp-releasing station; a combined gage and ejector 34 for gaging the position of the heels as they are loaded or introduced into the clamps and for subsequently ejecting the heels at the ejecting station; clamp closing apparatus including a tripping abutment 36 and a cam 38 for respectively effecting the tripping or releasing of the clamps from their open position and permitting the gradual closure thereof; an adjustable delivery chute 40 for directing the discharge of the ejected heels into various receptacles; and a measuring and sorting apparatus (Fig. 10) for adjusting the position of the delivery chute in accordance with the heights of the heels in the respective clamps whereby the heels are automatically sorted or delivered in accordance therewith.

Except for the automatic measuring and sorting apparatus, which constitutes the principal feature of the present invention, the machine is similar in general arrangement and operation to the machines described in the aforesaid Winkley patents, although it differs in specific structural details and, moreover, is designed to have separate clamp-releasing, ejecting and loading stations, in lieu of a single station as provided in the machines of the two patents referred to.

In view of the fact that the present invention is concerned chiefly with the automatic measuring and sorting apparatus which, broadly considered, is not in any sense restricted in its application to heel-presses of any particular type, it is deemed sufficient to give only a brief and general description of the construction and operation of the heel-press proper.

The supporting frame 20 embodies a central pedestal 44 (Fig. 3) and a main upright supporting bracket 46. The central pedestal 44 supports an upwardly projecting hollow tube or shaft 48, upon which is rotatably mounted a hub 50 that rests upon a suitably supported roller bearing 52 and which is provided with a rigid arm 54 that is periodically reciprocated by suitable mechanism that is actuated by the cam 28. The outer end of the arm 54 carries a pawl 56 (Fig. 12) which is adapted to engage a series of projections 58 that extend downwardly from the rotatable carrier 24 whereby the carrier is advanced step-by-step through its various positions.

The mechanism actuated by the cam 28 for effecting the periodic reciprocations of the arm 54 comprises, as shown best in Fig. 13, a bell-crank 60 one end of which carries a roll 62 cooperating with the cam 28 and the other end of which has a universal connection 64 to a spring-cushioned rod 66. The other end of the rod 66 is connected by means of a universal joint 68 to the outer end of the arm 54.

The treadle mechanism (Figs. 1, 3 and 7) for supplying power to the machine is mounted upon the main supporting bracket 46 of the frame 20 which is disposed at the front of the machine and carries a rotatable cam shaft 72 and a crank shaft 74. Fixed to the cam shaft 72 is a member 75 comprising cams 28 and 32. A segment 76 is also secured thereto and is provided with a groove 78 in its periphery for the reception of a flexible chain 80 which is attached to a plate 82 at one end thereof and which passes over and is retained in a grooved pulley 86 which is rotatably mounted on the crank shaft 74. Adjacent to the chain segment 76 and fixed to the cam shaft 72 is another segment 88 which has a grooved periphery for receiving a chain 90, one end of which is secured to a plate 91 that is disposed at the opposite end of the segment 88 from which the plate 82 is located upon the other segment 86. The other end of the chain 90 is connected to a heavy coil spring 94, the lower end of which is positioned within a socket 95 carried by the bracket 46 and is secured rigidly thereto. The spring 94, therefore, tends to rotate the cam shaft 72 and the cams associated therewith in a counterclockwise direction, as viewed in Fig. 1.

The other chain 80 which passes over the idler pulley 86 is attached to the outer end of an arm 96, the hub 98 of which is pivotally mounted on a stud 100. The hub 98 is also provided with the outwardly extending arm 22 which constitutes the treadle of the machine and embodies a pedal 104 upon which the operator's foot is placed in pressing the treadle. By reason of the mechanism just described, it is evident that the spring 94 not only tends to turn the cams on the cam shaft 72 in a clockwise direction, as viewed in Fig. 7, but it also serves to normally maintain the treadle 22 in its uppermost position.

Upon a depression of the treadle 22, the chain 80 is drawn downwardly over the pulley 86 and, therefore, the chain segment 76, to which the other end of the chain is attached, is rotated in a counter-clockwise direction (Fig. 7) whereby the cam shaft 72 and its associated cams 28 and 32 are similarly rotated. This movement of the cams effects the actuation of the component mechanisms of the machine in a manner to be hereinafter described. When the operator removes his foot from the treadle 22 in its lowermost position, the heavy coil spring 94 at once becomes effective and restores the cams and the treadle mechanism to their initial positions of rest.

Referring now to Figs. 2 and 3, the carrier 24 comprises two annular members 108 and 110, the lower member 108 being supported by radial ribs 112 from a hub 114 that loosely surrounds the stationary tube or shaft 48 and rests upon the upper end of the intermediate hub 50. The upper carrier member 110 is adjustably supported above the carrier 108 by means of a series of threaded rods 116 which are adapted to be concurrently turned through the agency of a chain 118 whereby the upper carrier member 110 may be adjusted vertically in position.

The respective sets of heel-clamps severally comprise an upper jaw 120 (Figs. 1, 4 and 5) that is pivotally suspended from the upper carrier member 110 in order to accommodate tapering heels, and a lower jaw 122 that is fixed at the upper end of a vertical rod 124 which is loosely mounted for vertical movement in a supporting bracket 126 that is secured to the periphery of the annular carrier member 108 by means of bolts 128.

Each bracket 126 comprises a pair of spaced downwardly projecting side members 130, the lower ends of which are united by an integral cross plate 132 (Figs. 4, 5 and 9). The rod 124, upon which the lower clamp jaw is mounted, projects through suitable openings in the upper and lower plates of the bracket 126 and the lower end thereof is provided with a block 134 which is secured rigidly thereto by means of a nut 136.

In order to prevent any rotative movements of the lower clamp jaw 122 and the block 134, a pin 138 is provided which extends upwardly from the block 134 and through a registering opening in the connecting plate 132 of the bracket 126 whereby the desired alinement of these members is maintained. The lower clamp jaw 122 is normally maintained in its raised position by means of a heavy coil spring 140 that surrounds the clamp supporting rod 124. The upper end of the spring 140 cooperates with an enlarged hub portion 142 of the lower clamp plate 122 (Fig. 9) and the lower end thereof rests against the cross plate 132 of the clamp supporting bracket 126.

In the operation of the machine, as each heel-clamp arrives at the clamp-releasing station R, (Fig. 4) the release of the clamp is effected by pulling down or retracting the lower clamp jaw 122. To enable this operation to be performed, each of the blocks 134 at the lower ends of the clamp supporting rods 124 is provided with a pivotally mounted roll 146 (Fig. 5) which is engaged and pulled downwardly by a suitable retractor at the proper time, as will be hereinafter set forth.

Having effected the opening or release of the heel-clamp the lower clamp jaw 122 is locked or retained in its open position, while the heel-clamp is advanced step-by-step through the ejecting and loading stations E and L, by means of a latch 150 (Fig. 4), which is pivotally mounted upon a pin 152 that is carried by the block 134. This pin 152 (Figs. 4 and 5) constitutes a measuring pin, as will hereinafter more fully appear, and is rectangular in form to prevent its turning. The latch 150 is provided at its free end with an angular notch 154 (Fig. 3) which is adapted to receive the corner of the lower plate 132 of the clamp bracket 126 when the latch occupies its vertical position. A spring 156, one end of which is secured to one of the upright bracket members 130 and the other end to a pin 158 at the end of the latch 150, serves to normally maintain the latch in its raised or vertical position, so that if the lower clamp jaw 122 is drawn downwardly by the retractor against the action of the spring 140, said latch is immediately moved into its latching position, as shown in Fig. 4, whereby the lower clamp jaw is retained in its open or released position until the latch is tripped in a manner to be hereinafter set forth.

In order to arrest the movement of the rotatable carrier 24 and its associated heel-clamps 26 as they are advanced step-by-step to bring the heel-clamps successively into the operating stations R, E and L, where the clamps are released, the heels ejected and fresh heels loaded therein, the buffer 30 (Figs. 7 and 12) is periodically projected into the path of movement of the series of projections 58, hereinbefore mentioned as extending downwardly from the lower carrier member 108.

The buffer 30 (Figs. 5, 7, 12 and 13) comprises the upper end of a rod 160 that is vertically movable through an upright yoked arm 162 of a bracket member 164, which is pivotally mounted upon the cam shaft 72 and has a laterally extending arm 166 provided with an elongated slot 168 through which the crank shaft 74 projects. Intermediate the ends of the rod 160 is secured a guide block 170 which has a sliding engagement with the sides of the yoke member 162. A spring 172 surrounds the rod 160 between the lower portion of the yoke member 162 and the guide block 170 and normally acts to urge the rod 160 and buffer 30 in an upward direction and into operative position. The upward movement of the buffer is cushioned by means of a coil spring 174 that surrounds the rod 160 between the guide block 170 and the upper end of the yoke member 162.

In order to periodically pull down the buffer 30 to permit the advance of the carrier 24, an arm 178 (Fig. 7) is pivotally suspended from the block 170 by means of a pin 180.

Before describing the construction and operation of the mechanism for actuating the buffer 30 by means of the arm 178, it should be understood that the buffer, or at least the projecting end 182 (Fig. 5) of the block 170 associated therewith, performs a double function, inasmuch as the projecting end 182, termed the retractor, of the block 170 is so positioned as to lie directly above the roll 146 that is associated with the lower jaw of the heel-clamp that occupies the clamp-releasing station R. Hence, as the combined buffer and retractor is pulled downwardly, the lower clamp jaw 122 of the clamp in the releasing station is drawn downwardly to effect the opening and release of the heel-clamp of which it forms a part, it being understood that the clamp is retained in its open or released position by the action of the latch 150 as already described.

The lowering of the combined buffer and retractor is effected through the arm 178 which is suspended from the block 170. This arm is provided with a hooked end 184 (Fig. 14) which is normally held by means of a spring 186 in engagement with the free end 188 of an arm 190 that is pivotally mounted upon the crank shaft 74. The arm 190 carries near its outer end a roll 192 that cooperatively engages the cam 32 which is designed to lower the arm 190, whereby the combined buffer and retractor is correspondingly lowered. Thus, the buffer 30 is withdrawn to permit the advance of the carrier, and the heel-clamp in the releasing station R is opened and is thereafter retained in its open position by the latch 150.

In order to relieve the carrier during its advancing movement, from the pressure and friction of the projecting end or retractor 182 of the block 170 upon the roll 146 of the opened clamp, the cam 32 is designed to cause the combined buffer and retractor to be raised slightly after the clamp has been latched in its open position. The disengagement of the retractor pin 182 from the roll 146 is thus effected and frictional resistance thus obviated. This retracting movement is accomplished as the cam 32 is rotated in a clockwise direction (Fig. 14) by the depression of the treadle 22, as will be understood.

The restoration of the combined buffer and retractor to its initial position by means of the spring 172 is made possible by disconnecting the hooked end 184 of the arm 178 from the free end of the arm 190. This is effected at substantially the end of the downward movement of the buffer and retractor by means of a trip pin 196 (Fig. 14) which projects laterally from the face of the cam 32 and which engages the hooked end 184 of the arm 178 as the cam 32 approaches the limit of its movement. The engagement, thus effected, serves to disengage the arm 178 from the arm 190 whereby the combined buffer and retractor is released and permitted to be raised by the spring 172.

For the purpose of relieving the buffer 30 from undue shock at the moment of impact between the carrier projection 58 and the buffer, at which time the movement of the carrier is arrested, a spring-pressed plunger 198 (Figs. 6 and 7) is provided which is yieldingly held in engagement with the side of the upright yoke member 162. By reason of the provision of the elongated slot 168 in the buffer bracket 164, a slight amount of lost-motion is permitted whereby the buffer bracket is allowed to move slightly as the spring-pressed plunger yields. A latch 200 (Figs. 7 and 12) is pivotally mounted at the upper end of the yoke member 162 and is maintained by means of a spring 202 in such position as to engage the projection 58 at the moment it engages the buffer 30 and thus prevent any recoil of the carrier.

After a heel-clamp is released and locked in its open position by means of the latch 150, the next step in the advance of the rotatable carrier 24 brings the heel in the open heel-clamp into cooperative engagement with the ejector 34 which serves first to break the joint between the heel and the clamp jaw, if there happens to be sufficient excess of paste to cause it to adhere thereto, and then to cause its ejection or discharge. The apparatus for accomplishing this operation will now be described.

Referring particularly to Figs. 1, 2, 4, 6 and 8, the combined ejector and breast gage 34 is substantially T-shaped in form and comprises a main stem 206 which has an adjustable connection 208 to one end of a pivoted supporting arm 210 (Fig. 2). Furthermore, the ejector comprises a laterally extending arm 212 which projects substantially at right angles to the main stem 206 and serves as a breast gage to determine the position of a heel as it is loaded into the clamp when it occupies the loading station L. The ejector 34 also comprises an oppositely extending arm 214 which is slightly inclined or sloped with respect to the direction of movement of the heel-clamp and which is provided with a slightly curved end 216. By reason of this inclination and curvature, the heel resting upon the lower clamp jaw 122, as it advances towards the ejecting station, is brought into engagement with the curved end 216 of the ejector arm 214. Therefore, as the advance of the heel-clamp and heel is continued, the curved and inclined arm 214 serves as a cam or wedge to force the heel outwardly to a slight degree and thus break the joint between the heel and the clamp jaw if the heel happens to adhere thereto. This action, of course, merely frees the heel from the clamp jaw but does not effect its discharge.

The discharge of the heel in the ejecting station E is effected through the action of a cam 220, which forms a part of the ejector supporting arm 210, through its engagement with a radially projecting lug 222 (Figs. 4 and 9) that is formed integrally with each clamp bracket 126. The ejector supporting arm 210 is fixed to a vertical shaft 224 which is rotatably mounted in a sleeve 226 that is rigidly supported upon a portion of the main supporting bracket 46. The lower end of the shaft 224 carries a substantially triangular plate 228 (Fig. 1), one corner of which is provided with a pin 230 and the other corner 232, is normally held in engagement with a fixed stop pin 234 by means of a spring 236 which is attached to the pins 230 and 234. Thus, the inward movement of the ejector supporting arm 210 is limited. Obviously, as the rotatable carrier is advanced to bring the heel-clamp and heel into the ejecting station E, the projecting lug 222 of the heel-clamp just in advance is brought into engagement with the cam 220 to cause the ejector supporting arm 210 and consequently the ejector itself, to be forced outwardly, whereby the loosened heel in the clamp is kicked out or ejected onto the adjustable chute 40 which is pivotally mounted opposite the ejecting station.

As soon as the heel is ejected and the lug 222 passes beyond the cam 220, the combined ejector and breast gage 34 is immediately restored to its initial position by means of the spring 236. The gage arm 212, therefore, is adapted to serve as a breast gage to properly position a freshly pasted heel that may be introduced into the empty heel-clamp which occupies the loading station L.

Having loaded a freshly pasted heel into the clamp, as just referred to, the latch 150 is released and the clamp permitted to close by means of a tripping abutment 36 and a cam 38 (Figs. 1, 3, 4, 6 and 7), the construction and manner of operation of which will now be set forth. Just beyond the loading station L and mounted rigidly upon a portion of the main supporting frame 46 is an angularly shaped upwardly projecting abutment 36, the forward end of which lies in the path of movement of the latch pin 158 when the latch occupies its operative position to retain the clamp in its open position. Located substantially opposite the latch tripping abutment 36, and in the path of movement of the clamp roll 146, is an angularly shaped cam 38 (Fig. 1) which is suitably secured to the main supporting bracket 46. The cam 38 is provided with a lower cam surface 244 which slopes upwardly in the direction of movement of the rotatable carrier.

The operation of the tripping abutment 36 and the cam 38 is as follows: When the carrier with its associated heel-clamps is rotated in clockwise direction, as viewed in Figs. 2 and 6, so that the clamp that has just been loaded with a fresh heel is moved away from the loading station L, the pin 158 on the latch 150, which retains the clamp in its open position, is brought into engagement with the end of the tripping abutment 36, whereby the latch is tripped and held downwardly so that it no longer prevents the closure of the lower clamp jaw 122. Just prior to the tripping of the latch, the roll 146 is brought beneath the right end of the inclined cam 38 so that when the latch is released in the manner just described, the cam 38 serves by its engagement with the roll 146 to determine the gradual closing operation of the clamp. As the carrier and associated clamp are further rotated, the roll 146 travels up the inclined cam surface 244 of the cam 38, thus permitting the clamp spring 140 to raise the lower clamp jaw 122 until the heel within the clamp is subjected to full pressure. This pressure is maintained upon the heel throughout the period that the carrier and its clamps are rotated step-by-step through their various positions, until it is brought into the clamp releasing station R. The clamp is then released and the heel subsequently ejected, as will be understood from the foregoing description.

The apparatus described so far appertains to the heel-press proper, by means of which freshly pasted heels are maintained under pressure in the heel-clamps during the drying or setting period of the paste and are subsequently released and ejected from the machine. This portion of the present invention is, except for certain improvements and peculiarities of structure and operation, similar in a general way to the machines shown and described in said Patents Nos. 1,452,671 and 1,452,672 hereinbefore referred to.

Attention is now directed to the automatic measuring and sorting apparatus which, in itself and in conjunction with the heel-press proper, constitutes the main feature of the present invention, and through the agency of which the heels that are successively loaded into the clamps are measured with respect to their height and are automatically sorted and segregated as they are ejected according as they conform to the requisite height or as they are determined to be too high or too low with respect thereto.

The adjustable chute 40 comprises part of the automatic sorting apparatus and is channel-shaped in form and pivotally mounted upon a pin 250 (Fig. 9), being adapted to occupy any of its operative positions A, B and C, as indicated in Fig. 8, to respectively discharge the heels according as they are too low, of proper or normal height, or too high. The pivot pin 250 upon which the chute 40 is mounted is carried in a sleeve 252 which is integrally associated with a sleeve 254 that forms a part of the main supporting bracket 46.

In order to lock the chute 40 in its various positions, the chute is provided near its pivotal end with three positioning openings 256 which are adapted to receive the upper end 258 of a locking rod 260. This locking rod 260 is slidably mounted within the sleeve 254 and is normally maintained in its uppermost position by means of a coil spring 262 which rests upon the upper end of the sleeve 254 and acts against a collar 264 that is associated with the upper end of the rod.

To enable the chute 40 to be adjusted from one position to the other, it is necessary to make provision for withdrawing the locking rod 260 from whatever positioning-opening 256 it occupies just prior to effecting the adjustment. The lower end of the rod 260, therefore, as shown best in Figs. 3 and 15, is pivotally connected to an arm 266 that projects forwardly from a yoke member 268 having a pivotal bearing upon the crank shaft 74. The yoke member 268 is also provided with a curved depending arm 270 which carries a pivotally mounted latch 272 that is normally maintained in the position shown in Fig. 15 by means of a spring 274, the free end of the latch 272 resting against a shoulder 276 and the latch itself serving to close a side recess 278 in the arm 270. By reason of the construction just described, it is evident that the limit of counter-clockwise movement of the latch 272 is determined by the shoulder 276, while the latch is free to move in a clockwise direction against the action of the spring 274.

Assuming the various parts of the apparatus to occupy the positions shown in Fig. 15, as is the case when the treadle mechanism of the machine is in its elevated position, the operation of the chute releasing device is as follows: As the treadle 22 is depressed, the cam member 75 which carries a laterally projecting pin 280 is moved in a clockwise direction, during which movement the pin 280 engages the latch 272 and passes freely through the recess 278 in the arm 270 without effecting any actuation thereof. When the treadle is released and allowed to be raised through the action of the heavy coil spring 94, the cam member 75 is moved in the opposite direction and, in so doing, the pin 280 engages the opposite side of the latch 272 which, being prevented from movement in a counter-clockwise direction, effects a clockwise rotative movement of the arm 270 and, therefore, the arm 266 through the yoke 268. The downward movement of the arm 266 causes the locking rod 260 to be withdrawn from the positioning-opening 256 whereby the chute 40 is released so that it may be adjusted to any of its other operative positions.

The adjustment of the chute 40 into its respective positions A, B and C is determined and effected by means of an automatic setting mechanism that is controlled in accordance with the measured heights of the heels. When a heel is subjected to pressure between the jaws of any of the clamps, it is clear that the amount of separation of the jaws is an indication of the height of the heel, and, since the upper clamp jaw is stationary, the position of any portion of the movable lower clamp jaw may be utilized to indicate the height measurement of the heel. It is found convenient to utilize the position of the rectangular pin 152, hereinafter termed the "measuring pin", of each heel clamp as it reaches the measuring station M for the purpose of determining the height of the heel in that particular clamp and for controlling the operation of the chute-adjusting mechanism. Obviously, the higher the heel, the lower will the pin 152 be depressed, and, conversely, the lower the heel, the higher the pin will be elevated.

In making use of the position of the rectangular measuring pin 152 when the heel-clamp reaches the measuring station, the hooked end 282 (Fig. 10) of an arm 284 is so positioned as to be engaged by the pin 152 if the heel within the clamp is too low, while the free end of a pawl 286 that is pivotally mounted upon a rod 288 is engaged by the pin 152 if the heel is too high. Obviously if the heel is of the normal height, the measuring pin 152 will pass freely between the hooked end 282 and the pawl 286.

The arm 284 is provided at its free end with a slot 290 through which projects a pin 292 that is rigidly secured to a bracket 294 that is fixed to the main supporting bracket 46. This pin 292, therefore, serves to support the free end of the arm 284 and, by reason of the pin-and-slot connection, to permit it to be actuated in a horizontal direction. The other end of the arm 284 has a pivotal connection by means of a pin 296 to a master lever 298 which is pivotally mounted intermediate its ends upon a pin 300 that is supported by the bracket 294. The lower end of the lever 298 is pivotally connected through a pin 302 to the right-hand end of the rod 288 which carries the pawl 286.

The master lever 298 is adapted to occupy three measuring positions shown at the right in Fig. 10 by the position-indicating lines A—A, B—B and C—C, which respectively correspond to low, normal and high heels in the same manner as the chute positions A, B and C.

The master lever 298 is maintained in its normal position B—B through the agency of a centering device embodying independent centralizing springs 304 and 306. These springs surround a rod 308 that is fixedly mounted in a portion of the bracket 294 and which is provided intermediate the springs with a collar 310 that is pinned to the rod. A sleeve 312 surrounds the collar 310 and is slidably mounted thereon. This sleeve forms an integral part of a carrier member 314 which is slidably mounted upon a guide rod 316 (Fig. 11) that is positioned directly behind the rod 308. The carrier 314 is provided with an upwardly projecting portion 318 having a vertical slot 320 therein for the reception of a roll 322 that is pivotally mounted upon the pin 302 which connects the rod 288 to the lower end of the lever 298. As the master lever 298 moved from one position to another, it is evident that the sleeve 312 is correspondingly actuated so that the one or the other centralizing springs 304 and 306 is compressed by reason of the engagement of the sleeve 312 with one of the outwardly disposed thimbles or collars 324 that are slidably located upon the rod 308 and disposed at either side of the movable sleeve 312.

As shown in Fig. 10, a low heel has been measured and advanced into the releasing station R, and the sleeve 312 has been actuated from its normal to its right-hand position, whereby the right-hand thimble 324 has been moved outwardly to compress the spring 306. By reason of the fact that the collar 310 is pinned to the rod 308 there has been no elongation of the spring 304. The master lever 298 has also been actuated into its left-hand or low-heel position A—A. The spring 306 having been compressed by the engagement of the measuring pin 152 with the hooked end 282 of the arm 284, said spring is in readiness to centralize the master lever 298 as soon as the clamp holding the low heel in the releasing position R has been released or opened, during which operation the measuring pin 152 is disengaged from the arm 284.

Assuming the heel in the clamp that occupies the measuring station M to be too high, the operation of this portion of the apparatus is as follows: The heel, being too high, the measuring pin 152 occupies such a lowered portion that it engages the free end of the pawl 286 that is carried at the end of the arm 288, and, as the carrier and associated clamps are advanced into the releasing station R, the arm 288 is drawn to the left, thereby actuating the master lever 298 into its high heel position C—C, as shown in Fig. 1. Thus, the sleeve 312 is moved to the left and, through the left-hand thimble 324, effects the compression of the centralizing spring 304, while the other spring 306 remains undisturbed. The spring 304, therefore, is in readiness to effect the centralization of the lever 298 as soon as the pawl 286 is released from the measuring pin 152.

This release of the pawl 286 is accomplished by the following means and in the following manner: The free end of the rod 288 is movably supported upon the head 326 of a pin 328 that is normally maintained in its raised position by means of a spring 330. The upward movement of the pin is limited by a stop-nut 332. By suitably adjusting the stop-nut 332, the free end of the pawl 286 may be positioned at will, and is preliminarily set to a height which corresponds to the greatest permissible height of heel. Adjacent to the spring-cushioned pin 328 is another similar pin 334, over which a tail-piece 336 of the pawl 286 is disposed when the adjusting mechanism has been set by a high heel, as shown in Fig. 1.

When the heel-clamp occupying the clamp-releasing station R and containing the high heel is opened by means of the retractor, as already explained, the measuring pin 152 is depressed into engagement with the rod 288 and thereby forces said rod downwardly upon the spring-cushioned pin 328 which yields to permit such movement. In so doing, the tail-piece 336 of the pawl 286 is caused to engage the spring-cushioned pin 334, whereby said pawl is rotated in a clockwise direction against the action of its biasing spring 338. Thus the free end of the pawl is depressed out of engagement with the measuring pin 152, whereupon the spring 304 that has previously been compressed, functions to restore the master lever 298 to its normal position B—B.

Having described the manner in which the master lever 298 is actuated into its respective operative positions A—A, B—B and C—C, according as the heel being measured is found to be too low, normal or too high, a description will now be given of the manner in which the chute 40 is correspondingly set or adjusted so that the heel that is measured in the measuring station M shall be ejected into the proper receptacle when it is advanced into the ejecting station E.

This adjustment of the delivery chute 40 is accomplished by means of an arm 344 (Figs. 10 and 11) which is integrally associated with the master lever 298 and extends upwardly and forwardly in general alinement therewith. The upper end of the arm 344 has a universal connection 346 to one end of a horizontal rod 348 having at its other end a pair of upwardly projecting lugs 350 which carry a rod 352 that is fixed thereto. The rod 352 is mechanically associated with the chute 40 in the same general manner as the rod 308 is connected to the master lever 298, said rod 352 being provided with a centrally located collar 354 that is pinned thereto. Coil springs 356 and 358 are disposed around the respective ends of said rod on either side of the collar 354, the outer ends of the springs resting against the lugs 350 and the inner ends thereof pressing against inwardly turned slidable thimbles 360, which normally abut against the collar 354. A recessed block or sleeve 364 is slidably mounted upon the collar 354 and upon the inwardly turned ends of the thimbles 360, and said block has a pivotal connection by means of a threaded pin 366 (Fig. 8) with the chute 40.

By means of the centralizing spring device just described, the chute 40 is caused to occupy an operative position corresponding to the position A—A, B—B or C—C of the master lever 298, as determined by the height of the heel being measured. In Figs. 8 and 10, the automatic measuring and adjusting mechanism is shown in the position which it occupies after a low heel has been measured and the delivery chute 40 adjusted to its low heel position A, in readiness to properly discharge the low heel when it is advanced by the rotation of the carrier from the releasing station R into the ejecting station E.

Assuming the various parts of the mechanism to occupy the positions shown, the operation thereof is as follows: The clamp-opening retractor, which constitutes the end 182 of the block 170 (see Fig. 5), is first drawn downwardly by the action of the cam 32, thereby being brought into engagement with the roll 146 of the heel-clamp containing the low heel in the clamp-releasing station. The lower clamp jaw 122 is thus retracted or opened to such an extent that the latch 150 is permitted to assume its operative position to retain the clamp in its open position. As the lower clamp jaw 122 is thus pulled down into its open position, the measuring pin 152 is disengaged from the hooked end 282 of the arm 284 (see Fig. 10). The spring 306, in its compressed condition, is thereby released and permitted to actuate the master lever 298, together with the rod 348 and mechanism associated therewith, into its normal position B—B, or approximately in said position inasmuch as the action of said spring is opposed slightly by the relatively light spring 356 which is correspondingly compressed during the operation. The compression of the spring 356 is effected by reason of the movement to the right of the arm 348 while the chute 40 is locked in its low heel position A by means of the locking rod 260, as already explained.

The rotary carrier and the heel-clamp which has just been opened in the clamp-releasing station R is then advanced a step into the ejecting station E by means of the cam 28 and the mechanism associated therewith, during which operation the joint between the heel and the lower clamp jaw 122 is broken and the heel ejected into the chute 40 which directs the low heel into the receptacle for low heels in accordance with the operation of the automatic measuring and assorting apparatus.

As this operation takes place, a new heel is brought through the measuring station M and into the clamp releasing station R, and, consequently, the newly presented heel is measured and the adjusting apparatus set in the following manner: As the heel-clamp containing the new heel, which for illustrative purposes will be considered to be too high, is advanced from the measuring station to the clamp-releasing station, the measuring pin 152 is brought into engagement with the free end of the pawl 286, thereby pulling the rod 288 to the left and setting the master lever 298 in its high heel position C—C, as will be understood. This movement causes the compression of the centering spring 304 and, by reason of the increased movement to the right of the rod 348, further compresses the spring 356 associated with the chute-centralizing device. After the newly presented heel reaches the clamp-releasing station and during the upstroke of the treadle mechanism, the pin 280 (Fig. 15) is brought into engagement with the latch 272 and thereby effects the withdrawal of the locking rod 260 from the positioning-opening 256 which it occupies in the chute 40. Said chute is thereby released from its low heel position A where it has previously been locked, and, by reason of the compressed condition of the spring 356, is impelled into its high heel position C where it is immediately locked by the rod 260 through the operation of the spring 262. During this operation, the compression of the spring 356 is relieved and both springs 356 and 358 are restored to their normal conditions.

The centralizing spring 304, however, is still retained under compression, inasmuch as the action of the retractor 182 has not yet been effected to release the heel-clamp containing the high heel which now occupies the clamp-releasing station. As soon as the retractor is brought into operation, the clamp jaw 122 of the newly-presented heel-clamp is drawn downwardly, thereby causing the measuring pin 152 to engage the upper surface of the rod 288 and effect its depression against the operation of the spring-cushioned pin 328. This depression of the rod 288 brings the tail-piece 336 of the pawl 286 into engagement with the spring-cushioned pin 334 and thereby effects the release of the rod 288, whereby the spring 304 restores the master lever 298 to its substantially normal position B—B. Inasmuch as the chute 40 is locked in its high heel position C during this operation, the restoration of the lever 298 to its normal position places the spring 358 of the chute-centralizing device under compression, as will be understood.

Meanwhile the chute 40 remains locked in its high heel position C in readiness to properly direct the discharge of the high heel just measured when it is advanced into the ejecting station.

During this advance, let it be assumed that a heel of correct height is brought into the clamp-releasing station, it being remembered that the chute 40 is still locked in its high heel position C, the spring 358 is still compressed, the master lever 298 occupies substantially its normal position B—B, and the centralizing springs 304 and 306 are relieved of compression.

As the heel of correct height is moved into the clamp releasing station, the measuring pin 152 passes freely between the hooked end 282 of the arm 284 and the free end of the pawl 286 so that the master lever 298 and the centralizing spring device associated therewith, is still retained in its normal or substantially normal position. On the subsequent upstroke of the treadle mechanism, the locking rod 260 is withdrawn, thereby releasing the chute 40 from its high heel position C and permitting the compressed centralizing spring 358 to actuate the chute into its normal position B, where it is in readiness to properly discharge the heel of correct height which has just moved into the clamp-releasing station.

During the continuation of the operation of the heel-press, the various heels are independently measured and the delivery chute automatically adjusted in the manner described, whereby the heels are sorted and segregated according as their heights conform to or vary from the prescribed limits.

Although the invention has been set forth as embodying more or less specific structural details and arrangement and location of parts, both of the heel-press proper and of the automatic measuring and sorting apparatus, it will be understood that the advantages of the invention may be attained by structures which vary materially from those shown and described and, therefore, only such limitations should be imposed as are indicated in the appended claims.

Having illustrated and described the preferred embodiment of the invention, that which is claimed as new is:

1. A heel-press having, in combination, a movable carrier, a series of heel-clamps for holding heels under pressure mounted thereon, means for opening and closing said clamps, means for ejecting heels from the clamps when open, and means for sorting the heels in the respective clamps in accordance with their heights.

2. A heel-press having, in combination, a movable carrier, a series of heel-clamps mounted thereon, means for closing said clamps to press the heels, means for thereafter opening the clamps, and means at a single discharging station for successively engaging and discharging the heels in the respective clamps into groups in accordance with their heights.

3. A heel-press having, in combination, a series of independent heel-clamps for holding heels under pressure, and means for automatically discharging the heels successively from the successive clamps into groups in accordance with their respective heights.

4. A heel-press having, in combination, a series of independent heel-clamps for holding heels under pressure, means for successively ejecting the heels from the respective clamps, and means automatically positioned in accordance with the heights of the respective heels for directing the ejected heels into their proper receiving stations.

5. A heel-press having, in combination, a series of independent heel-clamps for holding heels under pressure, means for successively ejecting the heels from the respective clamps, a chute having a plurality of operative positions for directing the discharge of the ejected heels, and automatic means for measuring the heights of the heels in the clamps and positioning said chute in accordance therewith.

6. A heel-press having, in combination, a rotary carrier, a series of independent heel-clamps mounted thereon for holding heels under pressure, means for successively ejecting the heels from the respective clamps as they are rotated into an ejecting station, and means dependent upon the heights of the heels in said clamps and set by the rotative movement of said carrier for directing the ejected heels into groups according as they conform to or vary from a predetermined height.

7. A heel-press having, in combination, a series of independent heel-clamps for holding heels under pressure, means for successively ejecting the heels from the respective clamps at an ejecting station, means for measuring the heights of the successive heels before they arrive at the ejecting station, and means set by said measuring means for directing the discharge of the heels when ejected.

8. A heel-press having, in combination, a rotatable carrier, a series of heel-clamps mounted thereon, means for advancing said carrier step-by-step through an ejecting station, means for ejecting heels from the successive clamps at said ejecting station, and means set by the rotative movement of said carrier and dependent upon the heights of the heels in the respective clamps for sorting the ejected heels into groups of different heights.

9. A heel press having, in combination, a rotatable carrier, a series of co-operating heel-clamps mounted thereon, means associated therewith for normally maintaining the clamps closed, means for actuating said carrier and clamps through a clamp-releasing station, an ejecting station and a loading station, means for successively opening said clamps as they arrive at said clamp-releasing station, means for positively ejecting the successive heels from the open clamps at said ejecting station, and means for retaining said clamps in their open positions as they are moved through said ejecting and loading stations.

10. A heel-press having, in combination, a rotatable carrier, a series of cooperating heel-clamps mounted thereon, means for actuating said carrier and clamps through a clamp-releasing station and a loading station, means for successively releasing said clamps as they arrive at said clamp-releasing station, and latches carried by the respective clamps for retaining said clamps in their released positions until they are reloaded.

11. A heel-press having, in combination, a rotatable carrier, a series of heel-clamps mounted thereon, means for actuating said carrier and clamps through a clamp-releasing station, an ejecting station and a loading station, means for successively releasing said clamps as they arrive at said clamp-releasing station, latches carried by the respective clamps for retaining said clamps in their released positions as they are moved through the ejecting and loading stations, and means for thereafter tripping said latches to permit the clamps to be closed.

12. A heel-press having, in combination, a movable carrier, a series of cooperating heel-clamps mounted thereon, means for actuating said carrier and said clamps in a series of steps through a clamp-releasing station, an injecting station and a loading station, means operating during periods of rest of said carrier for successively releasing the clamps at the releasing station, and means for retaining said clamps in their released positions as they are moved through said ejecting and loading stations.

13. A heel-press having, in combination, a movable carrier, a series of cooperating heel-clamps mounted thereon, means for actuating said carrier and said clamps in a series of steps through a clamp-releasing station, an ejecting station and a loading station, and means operating during periods of rest of said carrier for successively releasing the clamps at the releasing station and positively ejecting the heels at the ejecting station.

14. A press for operating upon freshly pasted articles comprising a plurality of layers having, in combination, co-operating clamping members for holding the articles under pressure for a time sufficient for the paste to set, and means for discharging the articles so held and sorting them in accordance with their respective heights after being pressed and set.

15. A press for subjecting articles to pressure having, in combination, cooperating clamping members for holding the articles under pressure when closed, means for opening said clamping members, and means for discharging the articles into groups in accordance with their heights while under pressure.

16. A press for subjecting articles to pressure having, in combination, a movable carrier, a plurality of sets of cooperating clamping members mounted thereon, means for opening and closing said clamping members, means for positively discharging the articles from the open clamps in succession, and means for distributing the articles in accordance with their heights as they are discharged.

17. A press for subjecting articles to pressure having, in combination, a plurality of sets of cooperating clamping members for holding the articles under pressure, and a single means for successively engaging and discharging the articles from between said clamping members and distributing them in accordance with their respective heights.

18. A heel machine having, in combination, a movable heel-clamp, means for opening and closing said clamp, means for ejecting heels therefrom, and means for distributing the ejected heels in accordance with their heights.

19. A heel machine having, in combination, a heel-clamp for subjecting heels to pressure, means for ejecting heels therefrom, and means automatically adjustable in accordance with the heights of the respective heels for directing the ejected heels into their proper receiving stations.

20. A heel machine having, in combination, means for holding heels under pressure, means for ejecting heels therefrom, a chute having a plurality of operative positions for directing the discharge of the ejected heels, and automatic means for measuring the heights of the heels while under pressure and positioning said chute in accordance therewith.

21. A heel machine having, in combination, means for holding a heel under pressure, means for moving said heel into an ejecting station, means for ejecting the heel at said ejecting station, means for measuring the height of the heel before it arrives at said ejecting station, and means positioned by said measuring means for selectively directing the discharge of the heel when ejected.

22. A heel machine having, in combination, means for subjecting a heel to pressure, means for advancing said pressure means and heel through an ejecting station, means for ejecting the heel from said pressure means at said ejecting station, and means set by the advancing movement of said pressure means and dependent upon the height of the heel therein for distributing the ejected heel in accordance with its height.

23. A heel machine having, in combination, means for holding a heel under pressure, means for advancing said holding means and heel through an ejecting station and a loading station, means for releasing the pressure from the heel and effecting its ejection, and a latch carried by said holding means for retaining said holding means in released position during its movement through said loading station.

24. A heel machine for operating upon freshly pasted heels comprising a plurality of lifts having, in combination, means subjecting the heel to pressure for a time sufficient for the paste to set, means for measuring the height of the heel under pressure after the paste has set, and means responsive to said measuring means for distributing the heel in accordance with its measured height.

25. A heel machine having, in combination, means for advancing and subjecting a series of heels to pressure, means for successively releasing the pressure thereon at one station, and means for measuring the height of the heels under pressure and distributing the heels at another station after the pressure is released in accordance with the measured heights thereof.

26. A heel machine having, in combination, means for simultaneously supporting a plurality of heels in extended order, means for successively measuring the heights of said heels, and means for effecting the movement of said heels after being measured in different directions determined in accordance with the height of the heel.

27. A heel-press having, in combination, a movable heel-clamp adapted to be moved through an ejecting and a loading station, means for releasing said clamp, a combined ejector and breast gage, means for actuating said combined ejector and breast gage to eject the heel at said ejecting station and to subsequently position it to gage the position of a heel introduced into the clamp at said loading station.

28. A heel-press having, in combination, a movable heel-clamp adapted to be moved through an ejecting station, means for releasing said clamp, a normally idle ejector for releasing any heel that adheres to the clamp by a camming action during the movement of the heel-clamp into the ejecting station, and for subsequently ejecting the heel therefrom.

29. A heel machine having, in combination, means for supporting a heel, means for advancing the heel to a measuring station, means for subjecting the heel to prssure, means for measuring the heel under pressure, and automatic means selectively responsive to said measuring means for discharging said heel and directing it into its proper receiving station in accordance with its height.

30. A blank sorting machine having, in combination, means for measuring a blank, an adjustable chute for directing its discharge, means for locking the chute temporarily, centralizing means including a pair of oppositely acting springs tending to maintain the chute in a predetermined position, automatic means for varying the power of one of said springs in accordance with the measurement of the blank, and means for unlocking said chute to permit said centralizing means to actuate said chute into position to deliver the blank in accordance with its measurement.

31. A heel machine having, in combination, means for holding a heel under pressure, means for moving said heel into an ejecting station, means for discharging the heel from said pressure means at said ejecting station, means for measuring the height of the heel and releasing the pressure before it arrives at the said ejecting station, and means positioned by said measuring means for directing the discharge of the heel.

ERASTUS E. WINKLEY.